Sept. 12, 1944. H. H. BLAU 2,357,994
MINUS GREEN FILTER GLASS
Filed Oct. 6, 1941
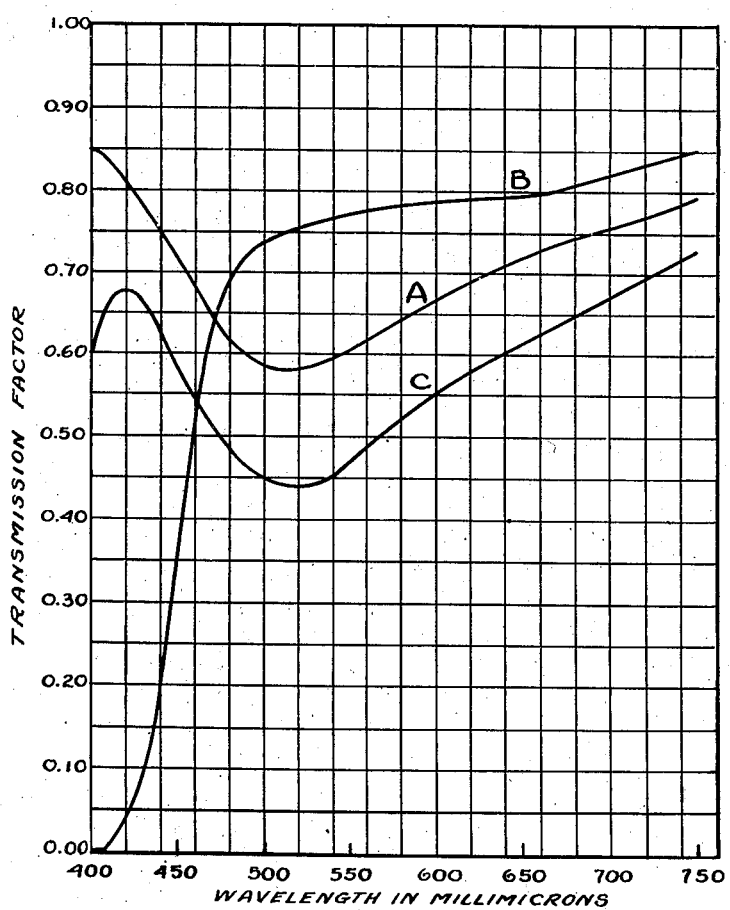
Inventor
HENRY H. BLAU
By
Attorney Patented Sept. 12, 1944

2,357,994

UNITED STATES PATENT OFFICE 2,357,994

MINUS GREEN FILTER GLASS

Henry H. Blau, Bexley, Ohio, assignor to Corning Glass Works, Corning, N. Y., a corporation of New York Application October 6, 1941, Serial No. 413,899

1 Claim. (Cl. 106—53)

This invention relates to colored glasses used for light filters and particularly the type known as a minus green filter. As the name implies, such a glass has a specific absorption for green light. Filters of this type are used for photographic purposes and it is very important that the glass have the highest possible transmission for blue light coupled with the least possible transmission of green.

Of the various glass coloring oxides, manganese most nearly produces the desired spectral characteristics in a silicate glass. In order to maintain the highest possible transmission of blue light, only relatively small amounts of manganese can be used, preferably not exceeding about 0.1% $MnO_2$. However, in such small concentrations the color effect due to manganese is difficult to control and is subject to considerable variation from melt to melt because of variable oxidation-reduction conditions during melting. Moreover, although desired, it has not heretofore been possible further to decrease the green transmission without at the same time decreasing the blue transmission in an equal or greater proportion.

An object of this invention is to produce a minus green filter which will absorb green light while having the highest possible transmission for all other visible light.

Another object is to produce a glass suitable for such a filter which is free from objectionable color variations and is light-stable.

Another object is to decrease the green transmission relative to the blue transmission of glasses containing small amounts of manganese dioxide.

To these and other ends the invention comprises the glass compositions to be hereinafter more fully described and claimed.

I have discovered that the difficulties encountered in the prior glasses can be largely obviated and the green transmission can be substantially decreased without undue decrease in the blue transmission by adding chromium to the glass in an amount not exceeding 0.004% $Cr_2O_3$ and maintaining the ratio of $Cr_2O_3$ to $MnO_2$ less than 5 to 100. A particularly desirable proportion for my purpose is 0.002% $Cr_2O_3$ and 0.08% $MnO_2$ which is equivalent to the ratio 2.5 $Cr_2O_3$ to 100 $MnO_2$. For example, a glass which I have found particularly suitable comprises:

| | Per cent |
|---|---|
| $SiO_2$ | 49 |
| $K_2O$ | 15 |
| PbO | 36 |
| $MnO_2$ | .08 |
| $Cr_2O_3$ | .002 |

The above composition may be compounded repeatedly and melted with excellent uniformity in color from melt to melt. The glass is also light-stable and the color does not change with use. The ratio of the transmission of blue and red to the transmission of green light with the resulting glass is greater than with prior glasses of the same manganese content.

I am aware of the Taylor Patent 1,411,134 in which it is shown that the color effect of $MnO_2$ in glass is intensified by the addition of $Cr_2O_3$, but, according to that patent a relatively large amount of $Cr_2O_3$ in proportion to $MnO_2$ is essential, particularly when the $MnO_2$ content is low. I have found that the proportions suggested in the patent cause a marked absorption in the blue portion of the spectrum while transmitting the green practically entirely. Such a result is diametrically opposed to the object of my invention. However, I have further found that the spectral characteristics of such glasses are reversed by the use of sufficiently small ratios of $Cr_2O_3$ to $MnO_2$. This may more readily be understood by referring to the accompanying drawing which shows the spectral transmission factors of three glasses of like thickness plotted against wave lengths in the visible region of the spectrum as indicated by the curves A, B, and C.

Curve A represents a glass which contains 0.08% $MnO_2$ but no $Cr_2O_3$ and which is indicative of prior minus green filter glasses.

Curve B represents a similar glass made according to the teaching of the Taylor patent above referred to and containing 0.01% $Cr_2O_3$ and 0.04% $MnO_2$ which is equivalent to the ratio 25 $Cr_2O_3$ to 100 $MnO_2$. This glass corresponds most nearly to glass D of the Taylor patent which contains 0.05% $Cr_2O_3$ and in which the ratio $Cr_2O_3$ to $MnO_2$ is about 25 to 100. It will be noted that this glass absorbs the blue but transmits the green. The light-stability of this glass is very poor and its color changes substantially in time when exposed to light.

Curve C represents a glass having the composition set forth above, in which is contained 0.002% $Cr_2O_3$ and 0.08% $MnO_2$. Here it is to be noted that the transmission of the green is substantially decreased over that of curve A while the transmission of the blue and red is decreased relatively little. In other words, glasses made in accordance with my invention have a greater absorption of green relative to the absorption of blue and red than prior glasses.

What I claim is:

A minus green glass having a low transmission for green light and a relatively high transmission for the remainder of the visible spectrum which consists of approximately 49% $SiO_2$, 15% $K_2O$, 36% PbO, 0.08% $MnO_2$, and 0.002% $Cr_2O_3$.

HENRY H. BLAU.